United States Patent [19]

Hirasaki et al.

[11] Patent Number: 5,315,332
[45] Date of Patent: May 24, 1994

[54] LENS-FITTED PHOTOGRAPHIC FILM PACKAGE AND FLASH UNIT

[75] Inventors: Norio Hirasaki; Junichi Takagi, both of Saitama, Japan

[73] Assignee: Fuji Photo Film Co., Ltd., Kanagawa, Japan

[21] Appl. No.: 867,526

[22] Filed: Apr. 13, 1992

[30] Foreign Application Priority Data

Apr. 11, 1991 [JP] Japan .................................. 3-032833
Apr. 11, 1991 [JP] Japan .................................. 3-032834
Apr. 11, 1991 [JP] Japan .................................. 3-032835

[51] Int. Cl.⁵ ............................................. G03B 15/03
[52] U.S. Cl. ............................. 354/149.11; 354/147
[58] Field of Search .................. 354/149.11, 147, 288, 354/233, 145.1; 362/16, 347

[56] References Cited

U.S. PATENT DOCUMENTS

| | | | |
|---|---|---|---|
| 4,234,706 | 11/1980 | Schindler | 362/16 |
| 4,304,479 | 12/1981 | Van Allen | 354/145 |
| 4,896,178 | 1/1990 | Ohmura et al. | 354/145 |
| 5,003,330 | 3/1991 | Kotani et al. | 354/145 |
| 5,028,943 | 7/1991 | Ishii et al. | 354/145.1 |
| 5,047,792 | 9/1991 | Asano et al. | 354/149.11 |

FOREIGN PATENT DOCUMENTS 62-245237 10/1987 Japan .

*Primary Examiner*—Michael L. Gellner
*Assistant Examiner*—Nicholas J. Tuccillo
*Attorney, Agent, or Firm*—Young & Thompson

[57] ABSTRACT

A panoramic lens-fitted photographic film package with a flash unit. A charge switch of the flash unit is actuated by depressing or sliding a charge switch plate which is formed in one of a pair of grips disposed on the front wall of the film package. A synchro-flash switch of the flash unit includes first and second contact segments extending parallel to each other toward a between-lens-shutter mechanism. The first contact segment is depressed by an arm portion formed integrally on a connecting lever of the shutter mechanism when the connecting lever is struck by an actuating lever to move a shutter blade to open an exposure opening, upon a shutter release operation being effected. The depressed first contact segment is brought into contact with the second contact segment, thereby outputting a synchro-flash signal. A light projector of the flash unit has a discharge tube, a reflector and a diffusion plate. The reflector is formed by shearing and folding a sheet material, and has splayed side reflection surfaces adapted to increase the horizontal illuminating angle. The diffusion plate is adapted to limit the vertical illuminating angle.

23 Claims, 9 Drawing Sheets

LENS-FITTED PHOTOGRAPHIC FILM PACKAGE AND FLASH UNIT

BACKGROUND OF THE INVENTION

1. Field of the Invention

The present invention relates to a flash unit, and more particularly to an inexpensive compact flash unit for a lens-fitted photographic film package, especially for a panoramic lens-fitted photographic film package.

2. Related Art

Lens-fitted photographic film packages for panoramic photography (hereinafter referred to as panoramic film packages) are known, for example, from U.S. patent application Ser. No. 07/667,758, which are a single-use throwaway camera pre-loaded with photographic film. Such panoramic film packages make it possible to take panoramic pictures whenever desired without buying or carrying an expensive and heavy camera. A panoramic film package uses a wide angle lens system having a short focal length of about 25 mm as a taking lens, and the exposed area of the film is defined by a horizontally extended frame 12×36 mm in size. Upon printing, the 12×36 mm picture frame is enlarged at a magnification twice the standard magnification for a standard 24×36 mm picture frame of 35 mm film. As a result, a print twice as long as a standard size print is provided.

Because of such a large print magnification, it is required to minimize the blur of the original images. For this reason, a panoramic film package presently marketed by Fuji Photo Film Co. Ltd. is provided with a pair of grips disposed on both horizontal sides of the taking lens, for surely and stably holding the panoramic film package. The grips also prevent the fingers from entering the wide angle field for panoramic photography which is defined by the angle of view of the taking lens.

The wide angle lens system is composed of two lenses. Because the principal point of the lens system lies between these lenses, an aperture stop member for defining the aperture size (the size of exposure opening) and a shutter mechanism for opening and closing the exposure opening are also disposed between these lenses.

The shutter mechanism includes a V-shaped shutter blade which is pivotal about an axis disposed at one end of the V-shape, whereas the other end of the V-shape opens and closes the exposure opening upon pivoting. The shutter mechanism further includes an actuating lever and a connecting lever. One end of the connecting lever is in the path of the actuating lever, and the other end is engaged with the elbow of the V-shaped shutter blade. When the actuating lever is moved, the movement is transmitted to the shutter blade through the connecting lever, and the shutter blade is caused to pivot in a direction perpendicular to the optical axis of the taking lens, thereby opening and closing the exposure opening. Since the connecting lever partly overlaps the shutter blade, the shutter blade is prevented from oscillating in the optical axis direction.

The Fuji panoramic film package is principally for use in bright outdoor light. Therefore, it is impossible to take properly exposed pictures under low light, such as indoors. However, it is desirable to incorporate a flash unit in the panoramic film package, so as to take pictures under low light, for example for photographing a number of people standing side by side in a gathering.

Because the panoramic film package is a kind of disposable camera, it is necessary to minimize the cost of the flash unit, as well as the cost of the other parts of the panoramic film package. For this reason, it is preferable to use in the panoramic film package a simple flash unit as used in Fuji standard-type film packages for standard photography, such as disclosed in U.S. Pat. Nos. 4,896,178 and 5,003,330.

However, because the Fuji flash unit needs a charge switch, and a charge switch operation member is disposed on the front wall of the film package, it becomes necessary for incorporating the flash unit in the panoramic film package, to provide a charge switch operation member in addition to the grips on the front wall of the panoramic film package. If the charge switch is formed separately from the grips, the photographer must remove the fingers from one of the grips in order to charge the flash unit. This is inconvenient, and may reduce the stability of holding the film package, and so may cause a blur.

Such a simple flash unit also has a simple synchro-flash switch mechanism, wherein the synchro-flash switch contact is formed as a pair of resilient contact segments extending parallel to each other. A shutter blade disposed behind a single element taking lens pivots about an axis so as to open and close an exposure opening. The first contact segment is disposed in the path of the shutter blade, such that the shutter blade depresses the first contact segment upon fully opening the exposure opening. Thereby, the contact segments are brought into contact with each other, generating a synchro-flash signal.

However, it is difficult to dispose such contact segments in the path of the shutter blade of the panoramic film package. This is because the shutter mechanism of the panoramic film package is composed of a connecting lever and a shutter blade, and because these elements are disposed between two lenses, as described above. In addition to such a complicated construction, the shutter blade of the panoramic film package cannot be projected sufficiently from the lens holding portion. Consequently, it is necessary to change the taking lens system or the shutter mechanism of the panoramic film package from the construction of the Fuji panoramic film package in order to enable depression of the contact segment by the shutter blade. This increases the cost of the panoramic film package.

Moreover, because the simple flash unit is designed for standard-type film packages, of which the focal length is 35 mm and the exposure frame is 24×36 mm in size, the illuminating field of the flash unit is adapted to cover a photographic field defined by this focal length and this frame size, that is, a field defined by a horizontal angle of view of about 53°, and a vertical angle of view of 38°.

However, the horizontal and vertical view angles of the above-described panoramic film package are 75° and 24°, respectively. Obviously, the horizontal illuminating angle of the flash unit cannot cover the horizontal view angle of the panoramic film package. Therefore, if such a flash unit were used in the panoramic film package, both side areas of the panoramic photograph taken with flash would be under-exposed. On the other hand, because the vertical illuminating angle of the standard flash unit is too large relative to the vertical view angle of the panoramic film package, the flash unit would illuminate uselessly the area beyond the vertical view angle of the panoramic film package.

OBJECTS OF THE INVENTION

In view of the foregoing, an object of the present invention is to provide a flash unit which can be adapted to a film package with holding grips, and in which it is possible to operate the charge switch easily and without decreasing the stability of the user's grip on the package.

Another object of the present invention is to provide a flash unit, of which a synchro-flash switch mechanism can be incorporated in a film package having a shutter mechanism comprised by a connecting lever and a shutter blade.

Still another object of the present invention is to provide a flash unit whose illuminating angles match a horizontally elongated photographic field.

SUMMARY OF THE INVENTION

To achieve the above and other objects, the present invention provides a charge switch operation member which is formed as a part of one of a pair of grips, and can be depressed to turn the charge switch on. It is also possible to make the one grip itself as a charge switch operating member, which is slidable on the front wall of the film package to turn the charge switch on.

According to the present invention, it becomes possible to operate the charge switch of the flash unit while holding the film package stably by the grips. Therefore, blur is minimized, while the photographer's fingers are prevented from entering the photographic field or from interfering with the flash light.

According to an embodiment of the present invention, the connecting lever has a pressing arm formed integrally therewith, and the first contact segment of the synchro-flash switch is disposed in the path of the pressing arm. The first contact segment is depressed by the pressing arm to contact the second contact segment, for generating a synchro-flash signal for causing the flash unit to flash.

In this way, it becomes possible to incorporate the synchro-flash switch without the need for remarkable change of the fundamental construction of the standard taking lens system and/or shutter mechanism of the panoramic film package presently marketed e.g. by Fuji Photo Film Co. Ltd.

According to another embodiment of the present invention, a reflector of a light projector of the flash unit is formed as one body by shearing a sheet material and folding the sheared sheet to form corner portions, such that the corner portions of the sheet are positioned beyond those reflection surfaces which contribute to increasing the horizontal illuminating angle. Furthermore, a diffusion plate limiting the vertical illuminating angle is mounted on the front of the light projector.

According to this embodiment, the horizontal illuminating angle is increased by the reflector, while the vertical illuminating angle is limited by the diffusion plate. Therefore, a flash unit having this kind of light projector can be used to good advantage in the panoramic film package. Furthermore, because the reflector is made of sheet material, its cost is low. Because the corners are disposed beyond the reflection surfaces which contribute to widening the horizontal illuminating angle, light scattering by the corner portions will not diffuse the reflection, so that the light from the discharge tube is efficiently used for illumination. Therefore, the flash unit can substantially equally illuminate the whole area of a horizontally widened photographic field.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout several views, and wherein.

DETAILED DESCRIPTION OF THE PREFERRED EMBODIMENTS

Figure 1:
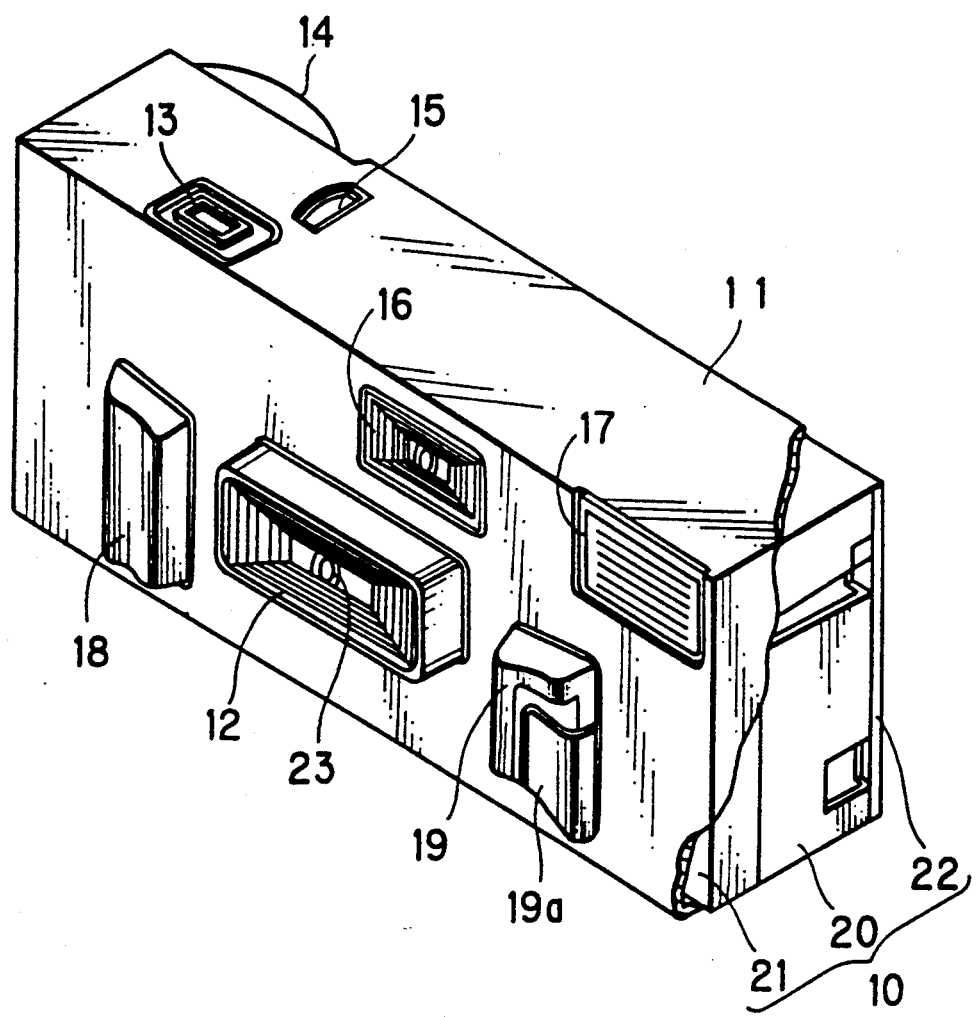
FIG. 1 is a perspective view of a film package having a flash unit according to an embodiment of the present invention.

Referring to FIG. 1, a film package includes a package body 10 and an outer casing 11 encasing the package body 10. The outer casing 11 is made of cardboard or the like, and has openings for exposing a lens hood 12, a release button 13, a film advancing wheel 14, a frame counter window 15, a viewfinder window 16, a light projector 17, and a pair of grips 18 and 19. Therefore, the photographer can take pictures without the need for removal of the outer casing. The film package of this embodiment is adapted to take panoramic photographs and has an exposure frame 12×36 mm in size, which is horizontally elongated compared to a full-size frame of 35 mm film (24×36 mm). Correspondingly, the focal length of a taking lens system 23 of the film package is 25 mm, so that the horizontal and vertical angles of view of the photographic field are 75° and 24°, respectively.

The package body 10 includes a main body section 20, a front cover section 21, and a rear cover section 22. The constructions of the main body section 20 and the rear cover section 22 may be those disclosed in U.S. patent application Ser. No. 07/667,758.

Figure 2:
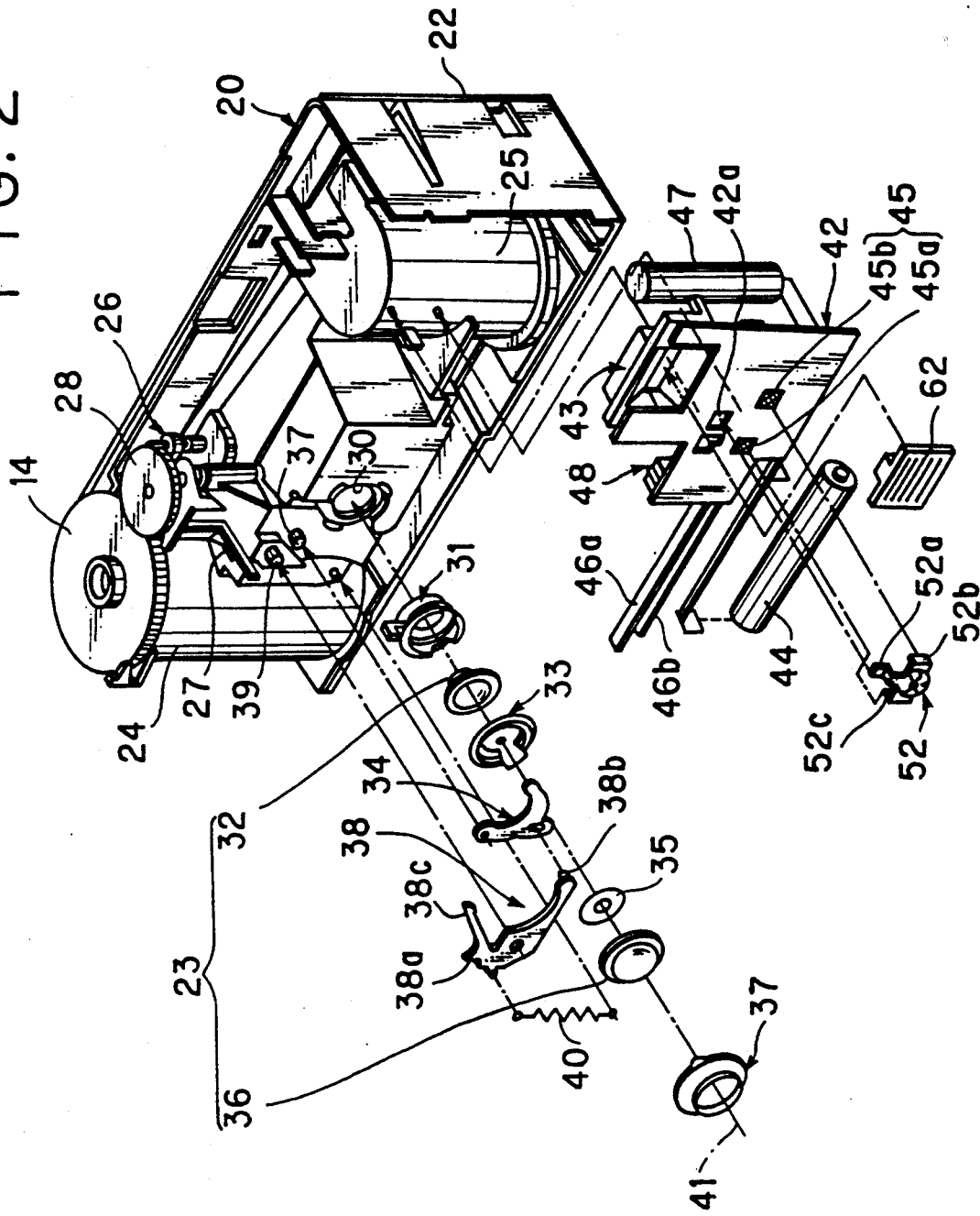
FIG. 2 is an exploded perspective view of a main body section and a rear cover section of the film package of FIG. 1.

As shown in FIG. 2, the main body section 20 has a film container chamber 24 and a film roll chamber 25 disposed on opposite horizontal sides of an exposure frame, which is not shown but is forme din the rear of the main body section 20. The film container chamber 24 holds a film container with a spool, whereas the film roll chamber 25 holds a roll of photographic film which is pulled out from the film container and wound into a roll at the factory prior to assembly of the film package. The film advancing wheel 14 is mounted on the top of the film container chamber 24, such that the photographic film is wound back into the film container by rotating the spool counterclockwise using the film advancing wheel 14, frame by frame as photography proceeds.

A shutter actuating mechanism 26 is incorporated in the main body section 20, which includes a sprocket (not shown) partly protruding from the rear of the main body section 20 and engaging in perforations of the photographic film, an actuating lever 27 and a counter disc 28. When the film advancing wheel 14 is rotated counterclockwise and the film is advanced by one frame, the sprocket makes one revolution and moves the counter disc 28 by one unit. Simultaneously, a shutter mechanism is cocked.

The main body 20 is formed in the front with an opening 30 into which a lens holder 31 is fitted. The lens holder 31 holds a rear lends 32, a spacing ring 33, a shutter blade 34, a shutter cover 35 and a front lens 36 inserted therein sequentially in this order from the rear, all these being securely held in the lens holder 31 by fitting a securing ring 37.

Figure 3:
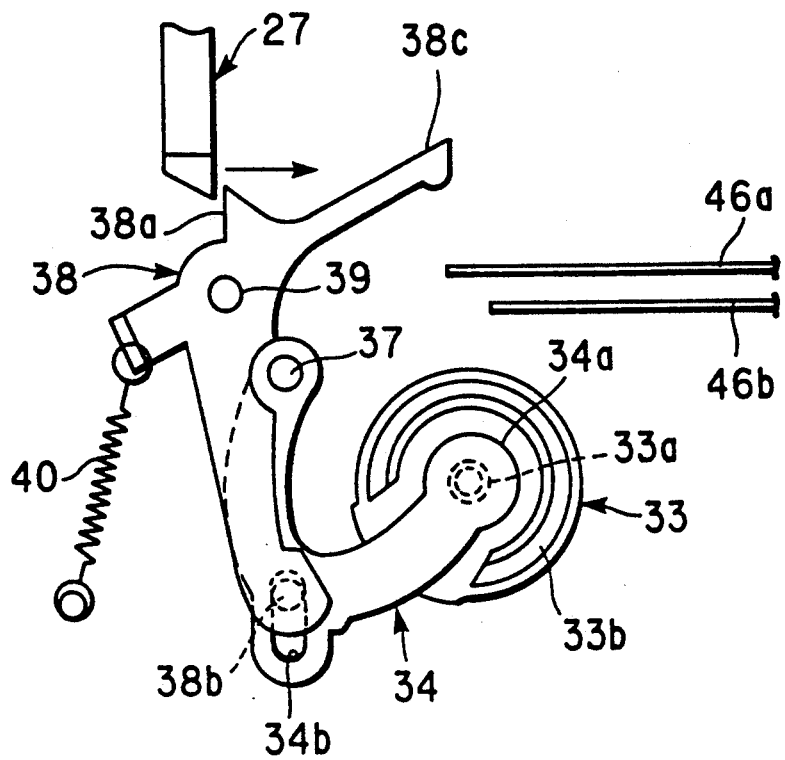
FIGS. 3 and 4 show parts of a shutter device of the film package in the closed and open shutter positions, respectively.
Figure 4:
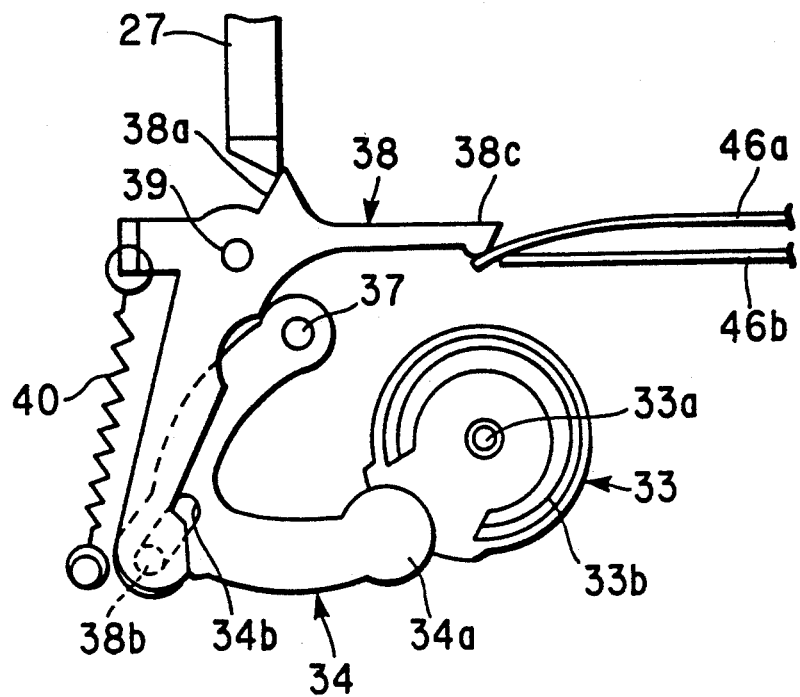

As illustrated in greater detail in FIGS. 3 and 4, the spacing ring 33 is formed at the center with an aperture 33a limiting the aperture size of the taking lens system 23. A rib portion 33b with a cut-out is formed surrounding the aperture 32a. Through the cut-out, a shutter blade 34 can be moved into and out of the center of the spacing ring 33, so as to open and close the aperture 33a. The shutter blade 34 is of substantially V-shape, and one end is pivotally mounted on a pin 37 formed integrally on the front of the main body section 20, whereas the other end forms a portion 34a for closing the aperture 33a.

The shutter blade 34 is actuated by the actuating lever 27 through a connecting lever 38. The connecting lever 38 is pivotally mounted on a pin 39 formed integrally on the front of the main body section 20, and is urged by a spring 40 to swing counterclockwise. An upper end 38a of the connecting lever 38 projects into the path of the actuating lever 27, while a lower end of the connecting lever 38 is formed with a pin 38b which engages in a slot 34b formed in the elbow of the shutter blade 34. The connecting lever 38 extends over a part of the shutter blade 34, that is, from the pin 37 to the elbow. The connecting lever 38 further has a pressing arm 38c protruding from the upper end 38a to the upper right as seen in FIGS. 3 and 4. When the actuating lever 27 strikes the upper end 38a while moving to the right as shown by an arrow in FIG. 3, the connecting lever 38 pivots clockwise against the action of the spring 40 and thereafter returns to the initial position shown in FIG. 3, under the force of the spring 40.

Referring again to FIG. 2, the main body section 20 has mounted thereon a printed circuit board 42 of a flash unit disposed on the right hand side of the front of the main body section 20. A light projector 43 and a battery 44 are mounted on the upper and lower front portions of the circuit board 42, respectively. A charge switch 45 and a main capacitor 47 of a flash circuit 48 are respectively disposed on the front and the rear sides of the circuit board 42.

The flash circuit 48 is connected to a pair of contact segments 46a and 46b of a synchro-flash switch 46 which extend parallel to each other in a horizontal direction. The free end of the upper segment 46a, which is longer than the lower segment 46b, is disposed in the path of the pressing arm 38c of the actuation lever 38. The segments 46a and 46b are made of conductive resilient thin sheet material.

When the connecting lever 38 pivots to and fro, the shutter blade 34 is caused to pivot about the pin 37 back and forth by the motion transmitted by engagement of the pin 38b and the slot 34b. As a result, the end portion 34a opens and then closes the aperture 33a, thereby making an exposure. Furthermore, when the shutter blade 34 opens the aperture 33a, the pressing arm 38c presses the contact segment 46a to bring it into contact with the contact segment 46b, as shown in FIG. 4. Thereby, the light projector 43 of the flash unit flashes in synchronism with the exposure. The pressing arm 38c moves away from the contact segment 46a when the shutter blade 34 closes the aperture 33a.

Figure 5:
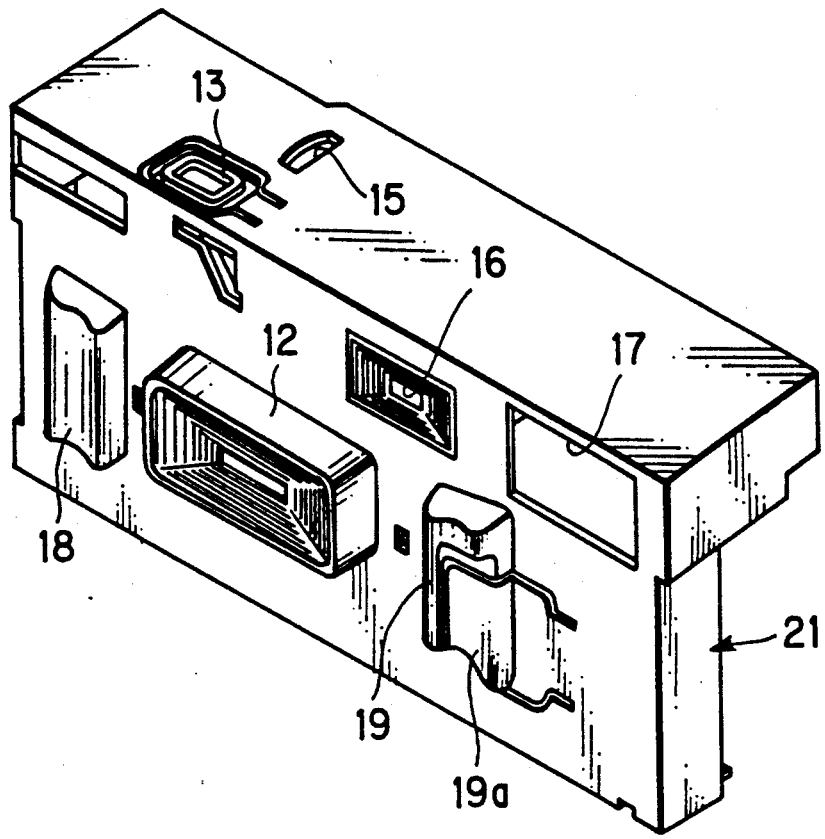
FIG. 5 is a perspective view of a front cover section of the film package.
Figure 6:
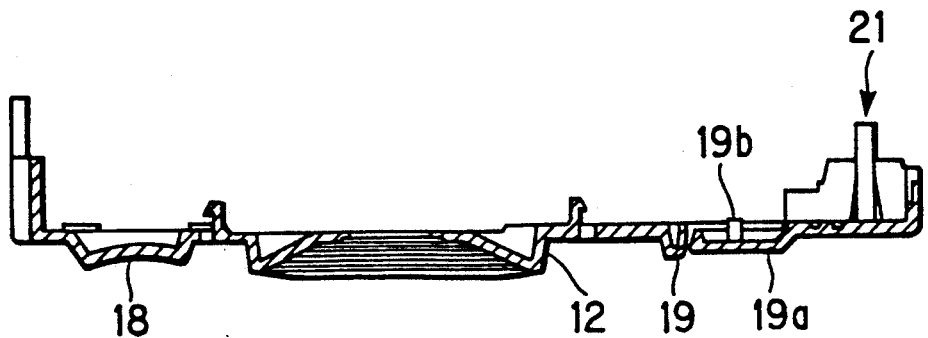
FIG. 6 is a horizontal sectional view of the front cover section of FIG. 5.

As shown in FIGS. 5 and 6, the hood 12, the grips 18 and 19, and the shutter release button 13 are formed integrally with the front cover section 21. The hood 12 shields the taking lens system 23 from stray light beyond the photographic field. The shutter release button 13 has a rectangular rib in a portion thereof which is exposed through the opening of the outer casing 11. However, the rib is flush with the outer surfaces of the outer casing 11, so that the shutter button 13 will not be accidentally depressed even if the film package is laid upside down.

Figure 7:
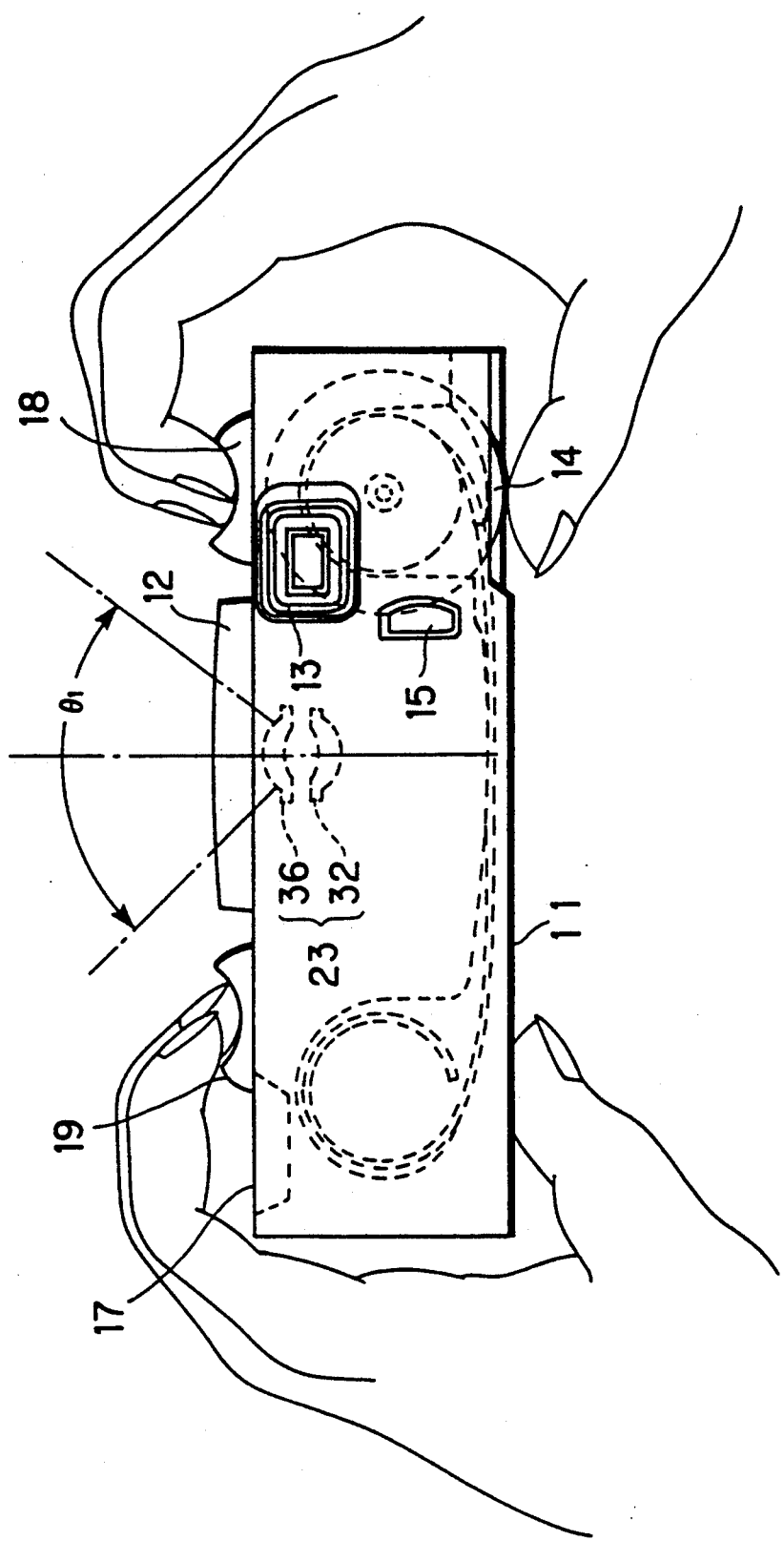
FIG. 7 is a schematic top plan view of the film package.

The grips 18 and 19 define the position of the fingers when handling the film package to take pictures, as is illustrated in FIG. 7. Each grip 18, 19 protrudes from the front wall surface but has a recessed portion, so that the fingertips fit into the recessed portion when gripping the film package. Because of the ridges formed on both sides of the recessed portion, especially the ridge closer to the hood 12, the fingers will not enter the photographic field, wherein the horizontal angle of view $\theta 1$ and the taking lens system 23 is, for example, 75°.

A resiliently depressible charge switch plate 19a is formed integrally from the material of the front cover section 21 and is bordered at its base by slots through section 21 and extends at its free end into a recess in grip 19. The charge switch plate 19a has on the rear side thereof a projection 19b, which is adapted to depress a movable contact segment 52 (FIG. 2) serving as a charge switch contact.

The movable contact segment 52 has a portion 52a extending vertically and bent at an acute angle. A pair of contact portions 52b and 52c of the movable contact segment 52 are disposed below the bent portion 52a, in registry with a pair of contact chips 45a and 45b of the charge switch 45. The bent portion 52a is inserted in a hole 42a and nipped between the circuit board 42 and the main body section 20, when the circuit board 42 is secured to the main body section 20, such that the contact portions 52b and 52c are ordinarily spaced from the contact chips 45a and 45b, although the contact portions 52b and 52c are bent toward the circuit board 42. Only when the charge switch plate 19a is depressed, the projection 19b depresses a center portion of the movable contact segment 52, so as to bring the contact portions 52b and 52c into contact with the respective contact chips 45a nd 45b. Thereby, charging of the flash unit is started. The center portion of the movable contact segment 52 is shaped as a forwardly convex surface, to impart resiliency to the center portion.

When photographing with flash, the photographer has only to grip the film package at the grips 18 and 19, as illustrated in FIG. 7, whereupon the fingers are naturally positioned on the charge switch plate 19a. Because of this arrangement of the charge switch plate 19a and the grips 18 and 19 as well, the photographer can hold the film package stably, so that blur is optimally prevented even during flash photography.

Figure 8:
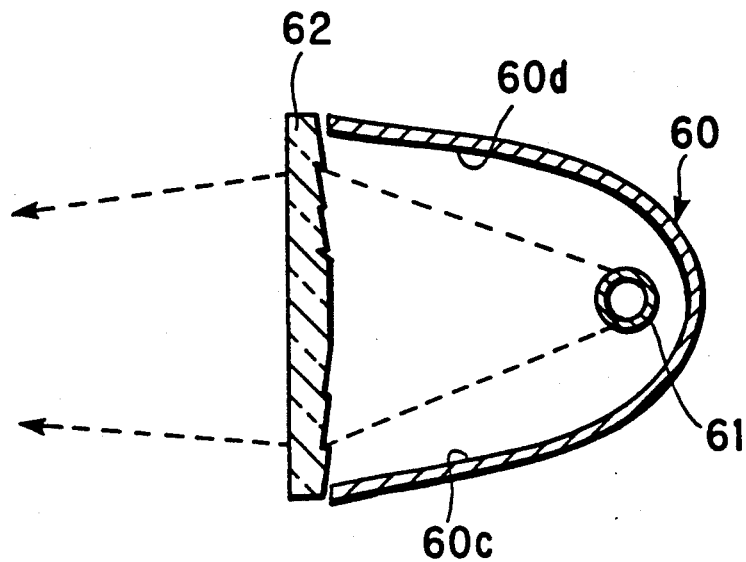
FIG. 8 is a vertical section of a light projector of the flash unit according to an embodiment of the present invention.
Figure 9:
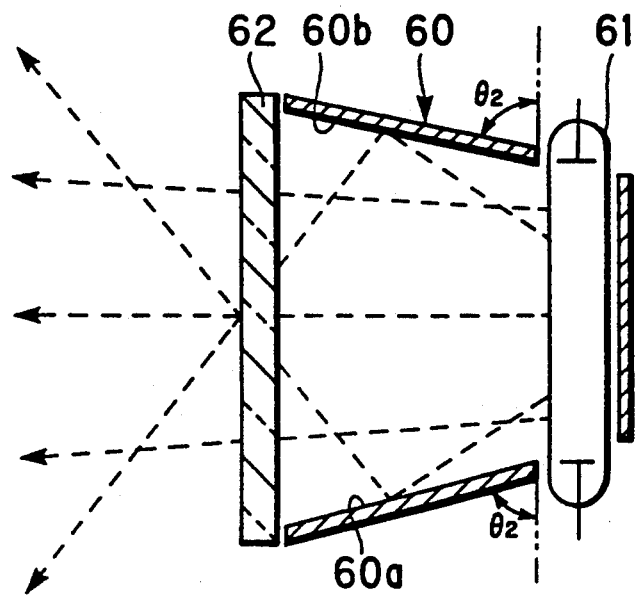
FIG. 9 is a horizontal section of the light projector of FIG. 8.
Figure 10:
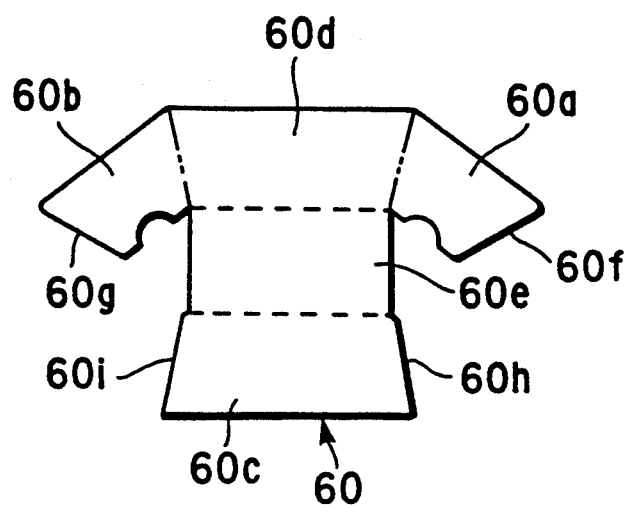
FIG. 10 is an exploded view of a reflector of the light projector.
Figure 11:
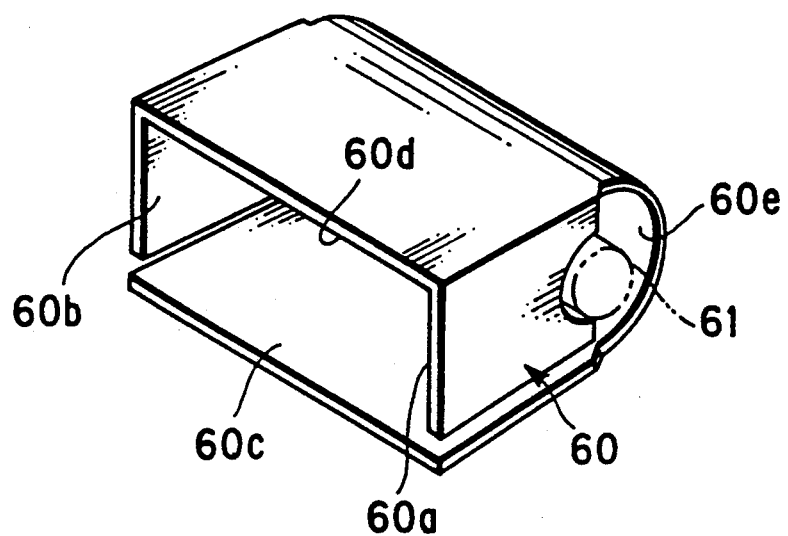
FIG. 11 is a perspective view of the reflector with a discharge tube.

Referring to FIGS. 8 to 11, the light projector 43 is comprised by a discharge tube 61, a reflector 60 and a diffusion plate 62. The reflector 60 is formed as one body by shearing lustrous or shiny sheet aluminum, as shown in FIG. 10. Both of the side reflecting surfaces 60a and 60b are formed by rectangularly folding the sheared sheet aluminum along chain-dotted line shown in FIG. 10. Bottom and top reflecting surfaces 60c and 60d are formed by curving the sheared sheet along dashed lines shown in FIG. 10, such that edges 60f and 60g are joined to edges 60h and 60i, respectively. In this way, the reflector 60 having the side reflecting surfaces 60a and 60b, the top and bottom reflecting surfaces 60d and 60c, and rear reflecting surface 60e surrounding the discharge tube 60 is formed, as shown in FIG. 11. The side reflecting surfaces 60a and 60b are each disposed at an acute angle $\theta$ relative to a plane in which the discharge tube 61 is disposed, as shown in FIG. 9, so that the horizontal illuminating angle of the reflector 60 is increased.

The diffusion plate 62 is a synthetic resin plate having fine grooves extending horizontally on its rear surface, so configured that the diffusion plate 62 serves as a Fresnel lens adapted to reduce the illuminating angle in the vertical direction, as shown in FIG. 8. The illuminating field defined by these illuminating angles sufficiently covers the photographic field defined by the focal length and the aperture size of the taking lens 23, without wasting light outside that field.

Moreover, because the joints between the edges 60h and 60f, 60i and 60g are disposed outside of the effective side reflecting surfaces 60a and 60b, the intensity of light beams reflected by the side reflecting surfaces is not reduced by these joints at the corners. Therefore, it becomes possible to illuminate the whole of a horizontally elongated photographic field at a substantially equal intensity. It is to be noted that the angle $\theta 2$ is preferably about 70° to 80° in this embodiment. However, the angle $\theta 2$ and/or the size of the reflecting surfaces and the diffusion plate 62 is variable correspondingly to the photographic field.

The operation of the above-described embodiment will be briefly described.

Figure 12:
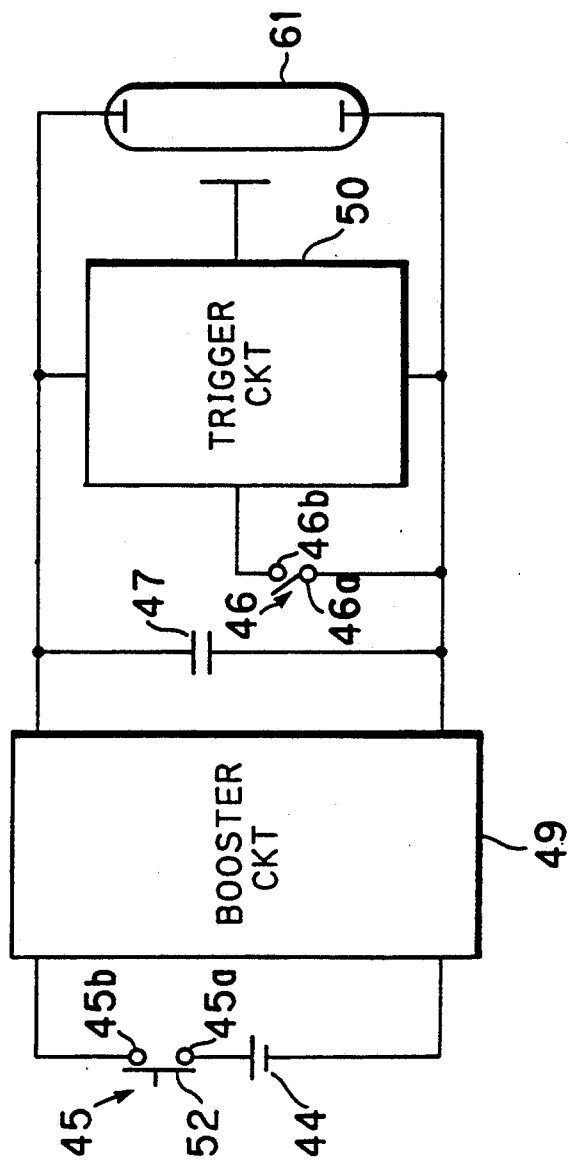
FIG. 12 shows circuitry of the flash unit.

As shown in FIG. 12, when the charge switch plate 19a is depressed by the fingers, the movable contact segment 52 electrically connects the contact chips 45a and 45b to each other, that is, turns the charge switch 45 on. Thereby, the battery 44 is connected to a booster circuit 49, so that the main capacitor 47 and a capacitor of a trigger circuit 50, which is included in the flash circuit 48, are charged by current supplied from the battery 44 through the booster circuit 49.

Upon depression of the shutter release button 13 while depressing the charge switch plate 19a, the shutter actuating mechanism 26 is released, so that the actuating lever 27 rapidly moves from the cocked position shown in FIG. 3 to the right. While moving to the right, the actuating lever 27 strikes the end portion 38a of the connecting lever 38, causing the connecting lever 27 to pivot clockwise against the action of the spring 40. The movement of the connecting lever 38 is transmitted to the shutter blade 34 through the pin 38b and the slot 34b, so that the portion 34a opens the aperture 33a. When the aperture 33a is fully opened, the pressing arm 38c of the connecting lever 38 simultaneously depresses and bends the contact segment 46a downwardly, so as to bring the contact segment 46a into contact with the contact segment 46b.

At this moment, the capacitor of the trigger circuit 50 is discharged to output a trigger signal to the discharge tube 61 of the light projector 43. Upon the trigger signal being emitted, the charge accumulated in the main capacitor 47 is discharged through the discharge tube 61. Thereby, a flash of light is projected from the light projector 43.

Immediately after the actuating lever 27 passes over the end portion 38a, the connecting lever 38 returns to the initial position under the influence of the spring 40. Simultaneously, the pressing arm 38c removes upwardly from the contact segment 46a, and the shutter blade 34 also closes the aperture 33a. After the removal of the pressing arm 38c, the contact segment 46a resiliently springs away from the contact segment 46b. Charging of the flash circuit 48 is terminated when the depression of the charge switch plate 19a is terminated.

After each exposure, since the film advancing wheel 14 is unlocked, it is possible to wind up the film by rotating the wheel 14. While the film is being wound up by one frame, the sprocket makes one revolution, and the shutter actuating mechanism 26 performs a shutter cocking operation through the sprocket. As a result, the actuating lever 27 is returned to the cocked position shown in FIG. 3, and at the same time, the film advancing wheel 14 is again locked against further rotation. In this condition, the film package is ready for the next exposure operation. The same operation as set forth above is repeated until all the available frames have been exposed.

After exposure of all the frames, the film package is forwarded to a photofinisher without the need for removal of the exposed film from the package. At the photofinisher, the container containing the exposed film therein is removed from the container chamber 24, after which development and printing are performed as is conventional. The developed film and finished prints are returned to the customer.

Although the charge switch plate 19a is depressed to turn the charge switch 45 on in the above-described embodiment, the charge switch plate 19a may be made slidable in vertical or horizontal directions, for switching over the power of the flash circuit 48.

Figure 13:
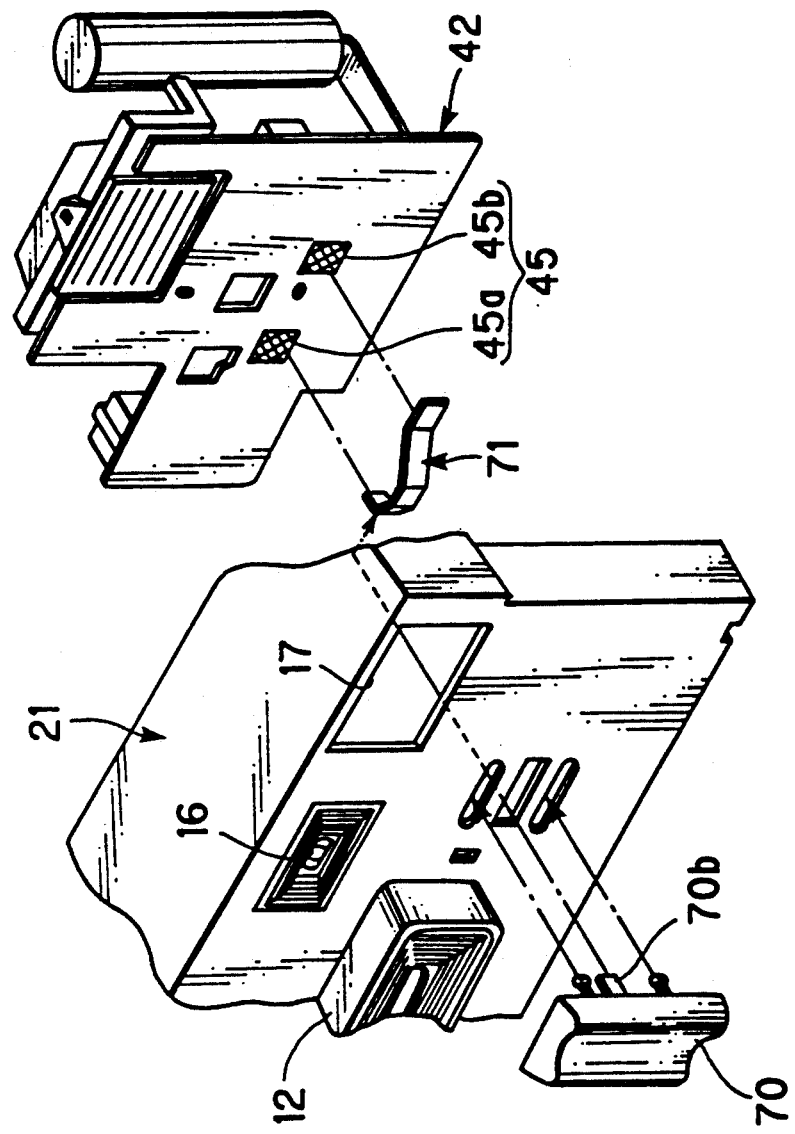
FIG. 13 is an exploded perspective view of another embodiment of a charge switch of the flash unit.

According to another embodiment shown in FIG. 13, it is also possible to provide a grip 70 slidable in a horizontal direction. In this case, not a segment of the grip 70 but rather the grip 70 itself serves as a charge switch operation member, wherein a projection 70b for depressing a movable contact segment 71 moves horizontally together with the grip 70. For easy and reliable gripping, the front surface of the grip 70 is also horizontally concave.

Although the present invention has been described in detail above with reference to preferred embodiments shown in the drawings, various modification within the scope and spirit of the invention will be apparent to people skilled in this art.

For example, although the charge switch 45 is an automatic-reset switch, which is turned off when the depression of the charge switch plate 19a is terminated, in the embodiment shown in FIG. 2, it is instead possible to construct the charge switch 45 as a manual-reset switch, wherein the power to the flash circuit 48 is turned on upon an initial depression of the charge switch plate 19a, and is turned off upon the next depression of the charge switch plate 19a. In this embodiment, it becomes possible to perform flash photography repeatedly once the charge switch plate 19a is depressed to turn on the power to the flash circuit 48, even if the depression is terminated thereafter.

Furthermore, although the connecting lever 38 is returned to the initial position under the force of the spring 40, it is possible to omit the spring 40 and adapt the connecting lever 38 to be returned to the initial position under the force of the resilient contact segment 46a. In this embodiment, the tip of the pressing arm 38c is placed in gentle contact with the free end of the contact segment 46a when the connecting lever 38 and the actuating lever 27 are in the initial position wherein the shutter blade 34 closes the aperture 33a. While moving to the right, the actuating lever 27 moves the connecting lever 38 farther in a clockwise direction, so as to cause the pressing arm 38c to bring the contact segment 46a into contact with the contact segment 46b and bend the contact segment 46a sufficiently for storing up the necessary returning force in the contact segment 46a.

Thereafter, when the actuating lever 27 clears the end portion 38a, the contact segment 46a resiliently returns to its initial position, thereby pushing the pressing arm 38c upward. As a result, the connecting lever 38 is moved back to the initial position. Because the pressing arm 38c contacts the contact segment 46a when the shutter blade 34 closes the aperture 33a, it is unnecessary to use a spring 40 to urge the shutter mechanism to a closed position. Moreover, the shutter blade 34 will reliably open the aperture 33a, because it is necessary for opening the aperture 33a to apply a certain force to the contact segment 46a and bend the same.

Furthermore, the flash unit of the present invention may be adapted not only to panoramic film packages, as set forth above, but also to any other types of film packages and inexpensive simple cameras as well.

Thus, the invention should be considered as limited only by the scope of the appended claims.

What is claimed is:

1. A lens-fitted photographic film package with a flash unit, which is pre-loaded with film and has a shutter mechanism, said lens-fitted photographic film package comprising:
   a pair of gripping projections formed in a front wall of said lens-fitted photographic film package on both horizontal sides of a taking lens system, for defining holding positions of said lens-fitted photographic film package; and
   a switch operating member for turning a charge switch of said flash unit on, said switch operating member being formed as at least a part of one of said gripping projections.

2. A lens-fitted photographic film package with a flash unit as recited in claim 1, wherein said charge switch includes a pair of stationary contacts and a movable contact segment that moves with said switch operating member.

3. A lens-fitted photographic film package with a flash unit as recited in claim 2, wherein said switch operating member is depressed to bring said movable contact segment into contact with said stationary contacts, thereby to turn said charge switch on.

4. A lens-fitted photographic film package with a flash unit as recited in claim 2, wherein said switch operating member is slidable on said front wall, so as to turn said charge switch on by connecting said stationary contacts to each other through said movable contact segment.

5. A lens-fitted photographic film package with a flash unit as recited in claim 1, wherein said shutter mechanism includes a shutter blade which is pivotally mounted on said lens-fitted photographic film package so as to open and close an exposure opening, and a shutter driving member, a first end of said shutter driving member being disposed in a path of an actuating member movable upon a shutter release operation, and a second end of said shutter driving member being engaged with said shutter blade, said shutter driving member having an arm formed between said first and second ends thereof, and wherein said flash unit has a synchro-flash switch including a first contact segment depressed by said arm when said shutter blade fully opens said exposure opening, and a second contact segment which is brought into contact with said first contact when said first contact is depressed, wherein when said first and second contact segments are contacted each other said synchro-flash switch is turned on to output a synchro-flash signal for causing said flash unit to flash.

6. A lens-fitted photographic film package with a flash unit as recited in claim 5, wherein said arm has a bulging portion at a free end thereof, said bulging portion depressing said first contact segment.

7. A lens-fitted photographic film package with a flash unit as recited in claim 6, wherein said taking lens system is composed of two lenses disposed before and behind said exposure opening, and wherein said one end of said shutter blade is pivot between said two lenses to open and close said exposure opening.

8. A lens-fitted photographic film package with a flash unit as recited in claim 1, wherein said lens-fitted photographic film package is adapted to take panoramic photography.

9. A lens-fitted photographic film package with a flash unit as recited in claim 8, wherein a light projector of said flash unit includes a discharge tube, a reflector surrounding said discharge tube, and a diffusion plate disposed in front of said reflector, said diffusion plate limiting a vertical illuminating angle of said light projector, and said reflector being formed by shearing a sheet material and by folding and joining said sheared sheet material, in a manner to increase a horizontal illuminating angle of said light projector, wherein join portions of said folded and joined sheet material are disposed beyond those reflection surfaces of said reflector which contribute to in increasing the horizontal illuminating angle.

10. A lens-fitted photographic film package with a flash unit as recited in claim 9, wherein said horizontal and vertical illuminating angles of said light projector correspond to horizontal and vertical angles of view of said taking lens system, respectively.

11. A lens-fitted photographic film package with a flash unit as recited in claim 9, wherein said sheet material is an aluminum sheet.

12. A lens-fitted photographic film package with a flash unit as recited in claim 9, wherein said diffusion plate is formed as a Fresnel lens with a plurality of horizontally extending fine grooves.

13. A flash unit for a lens-fitted photographic film package having a pair of gripping projections on both horizontal sides of a taking lens system in a front wall thereof, said flash unit comprising:
   a flash circuit having a capacitor;
   a charge switch for charging said capacitor;
   a light projector which discharges said capacitor to flash when a synchro-flash signal is supplied to said flash circuit; and
   a switch operating member for turning said charge switch on, said switch operating member being formed as at least a segment of one of said gripping projections.

14. A flash unit as recited in claim 13, wherein said charge switch comprises a pair of stationary contacts and a movable contact segment, said movable contact segment being actuated by said switch operating member so as to turn said charge switch on by connecting said stationary contacts to each other.

15. A flash unit as recited in claim 14, wherein said switch operating member is depressed to engage said movable contact segment with said stationary contacts, and wherein said movable contact segment leaves said stationary contacts to terminate charging when the depression of said switch operating member is terminated.

16. A flash unit as recited in claim 14, wherein said movable contact segment has a pair of contacting portions disposed horizontally side by side and a vertical portion extending from an intermediate portion of said contacting portions, said vertical portion being secured to a printed circuit board, and said contacting portions being brought into contact with said stationary contacts when said movable contact segment is depressed by said switch operating member pressing against said intermediate portion of said movable contact segment.

17. A flash unit as recited in claim 16, wherein said intermediate portion has a forwardly convex surface.

18. A flash unit as recited in claim 14, wherein said switch operating member is slidable on said front wall, so as to actuate said movable contact segment.

19. A flash unit for a camera having a shutter mechanism which includes a shutter blade that pivots to open and close an exposure opening, and a shutter driving member, a first end of said shutter driving member being disposed in a path of an actuating member movable upon a shutter release operation, and a second end of said shutter driving member being engaged with said shutter blade, said shutter driving member causing said shutter blade to open and then close said exposure opening when said first end of said shutter driving member is actuated by said actuating member, said flash unit comprising:
   a flash circuit which causes said flash unit to flash upon receipt of a synchro-flash signal;
   a synchro-flash switch for generating said synchro-flash signal, said synchro-flash switch having first and second contact segments extending toward said shutter mechanism; and
   an arm on said shutter driving member, said arm depressing said first contact segment into contact with said second contact segment when said shutter blade fully opens said exposure opening, thereby turning said synchro-flash switch on to output said synchro-flash signal.

20. A flash unit as recited in claim 19, wherein said arm has a bulged portion at a free end thereof.

21. A flash unit as recited in claim 19, said shutter driving member being elongated and having two ends, one of said ends being disposed on said arm and contacting said first contact and the other of said ends being pivotally connected with said shutter blade.

22. A flash unit as recited in claim 21, said shutter blade being elongated and said other end of said shutter driving member contacting said shutter blade at a point intermediate the length of said shutter blade.

23. A flash unit as recited in claim 22, the pivotal connection between said other end of said shutter driving member and said shutter blade being a lost motion connection.

* * * * *